United States Patent
Reel et al.

(10) Patent No.: US 10,417,687 B1
(45) Date of Patent: Sep. 17, 2019

(54) GENERATING MODIFIED QUERY TO IDENTIFY SIMILAR ITEMS IN A DATA STORE

(71) Applicant: Amazon Technologies, Inc., Seattle, WA (US)

(72) Inventors: Eric Anthony Reel, Seattle, WA (US); Elishema Rose Fishman, Seattle, WA (US); Madhu Madhava Kurup, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 1181 days.

(21) Appl. No.: 14/568,412

(22) Filed: Dec. 12, 2014

(51) Int. Cl.
 *G06Q 30/00* (2012.01)
 *G06Q 30/06* (2012.01)
 *G06F 16/9535* (2019.01)

(52) U.S. Cl.
 CPC ..... *G06Q 30/0631* (2013.01); *G06F 16/9535* (2019.01); *G06Q 30/0603* (2013.01); *G06Q 30/0627* (2013.01)

(58) Field of Classification Search
 CPC ............ G06Q 30/0601–0645; G06F 17/30646
 USPC ............................................... 705/26.1–27.2
 See application file for complete search history.

(56) References Cited

U.S. PATENT DOCUMENTS

| | | | | |
|---|---|---|---|---|
| 9,128,982 | B2* | 9/2015 | Choi | G06F 17/30448 |
| 9,454,581 | B1* | 9/2016 | Garg | G06F 17/30867 |
| 2004/0019536 | A1* | 1/2004 | Ashkenazi | G06Q 10/087 |
| | | | | 705/26.64 |
| 2013/0086509 | A1* | 4/2013 | Satyanarayana | G06F 17/3064 |
| | | | | 715/781 |
| 2015/0170250 | A1* | 6/2015 | Dalal | G06Q 30/0643 |
| | | | | 705/26.7 |

OTHER PUBLICATIONS

Raymond Eric Hostler; "Empirically Testing the Impact of Recommender Agents on Online Consumer Purchasing Behavior"; 2007; University of Maryland, Baltimore County, pp. 37-50 (Year: 2007).*

* cited by examiner

*Primary Examiner* — Naeem U Haq
*Assistant Examiner* — Norman Donald Sutch, Jr.
(74) *Attorney, Agent, or Firm* — Thomas Horstemeyer, LLP

(57) ABSTRACT

Disclosed are various embodiments for identifying similar items in a data store by generating a modified query from a user supplied query and from information stored about particular item in the data store. Predetermined descriptive terms can be designated as useful for identifying items, and these terms can be located within keyword data for a particular item. Item correlations can also be identified with respect to a category designation of the item. The modified query can be generated based upon the predetermined descriptive terms in the item keyword data and the item correlations.

21 Claims, 7 Drawing Sheets

FIG. 4

GENERATING MODIFIED QUERY TO IDENTIFY SIMILAR ITEMS IN A DATA STORE

BACKGROUND

Item recommendations can be generated for customers of electronic commerce sites in order to suggest additional items that may be of interest to a particular user based on an item that the user may be viewing. Yet, some recommended items suggested to a user may not be relevant to the item in terms of style, color, or other aspects of the item. Additionally, the use of an expansive catalog of items can make identifying items that are similar to a particular item on behalf of a user difficult or problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is an example user interface generated in the networked environment of FIG. 2 according to various embodiments of the present disclosure.

DETAILED DESCRIPTION

Users of an electronic commerce site may seek items of a particular style without necessarily being aware of all of the various choices that may suit their needs or preferences. For example, in the case of apparel items, a customer may be seeking a particular article of clothing in a particular style and price point, but may not know how to locate items that are comparable in style and price to an item that the user may be viewing. The present disclosure relates to providing suggestions for items that are similar to a particular item that a user may be viewing or that is provided as an input. For example, if a user is viewing a particular apparel item, such as a shirt, in a particular style, embodiments of the disclosure can locate other items in an electronic catalog that are similar in terms of style that may be offered by the same brand or other brands.

These items can be identified based upon keyword data associated with a particular item. More specifically, items that are similar to a particular item can be identified based upon particular descriptive keywords that are stored in an electronic catalog in association with the item. Certain descriptive keywords can be identified as relevant or "interesting" in that they can facilitate locating items in an electronic catalog. Accordingly, embodiments of the disclosure can locate similar items by identifying one or more of these descriptive keywords associated with a particular item and generate a modified query that combines these descriptive keywords with a user supplied search query that a user may have entered into a search engine to arrive at a particular item in the electronic catalog.

Figure 1:
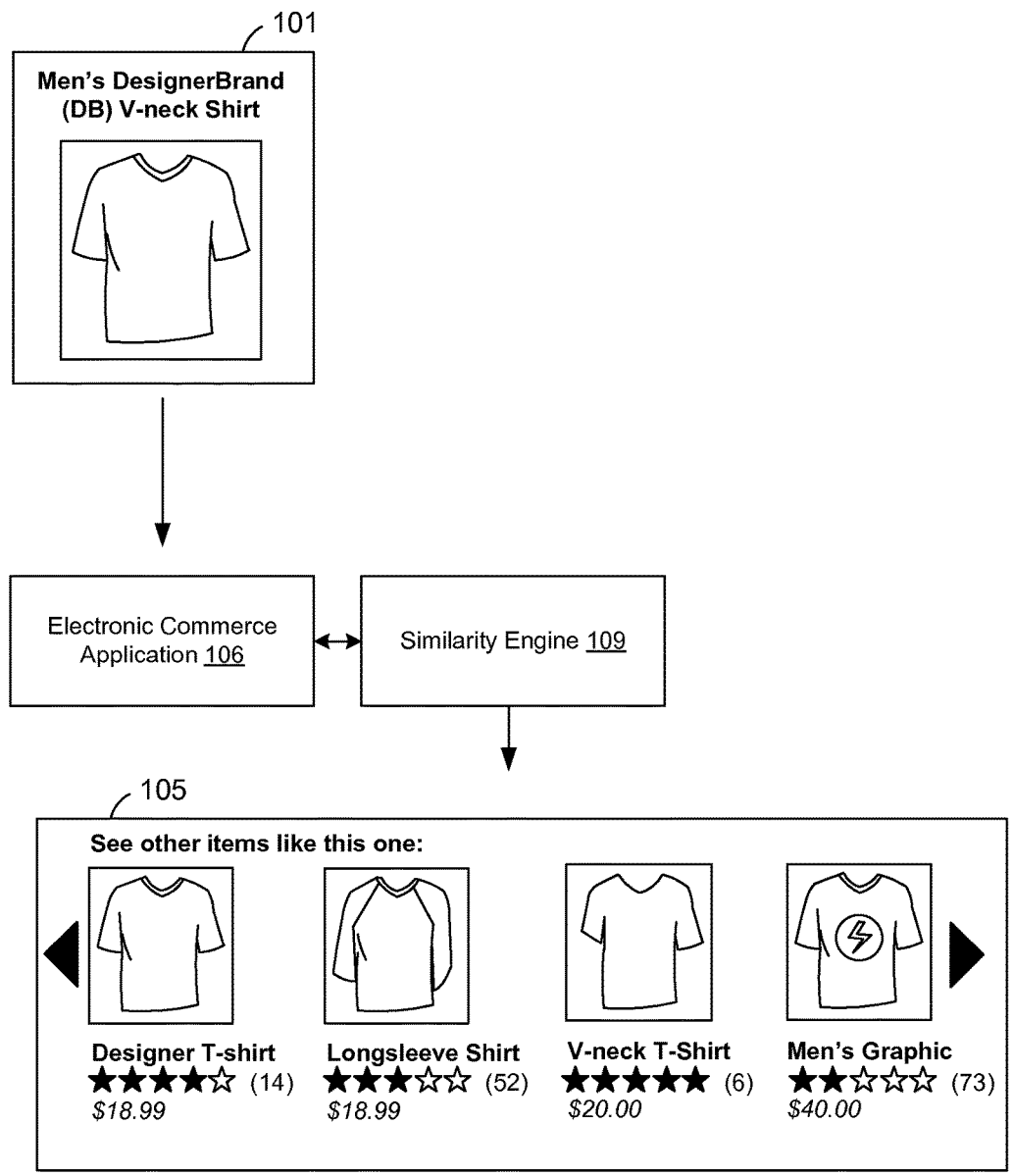
FIG. 1 is an example scenario illustrating portions of an embodiment of the present disclosure.

With reference to FIG. 1, shown is an illustrative scenario depicting a similarity engine 109 that identifies one or more items that are similar to a respective item 101 based upon keyword data associated with the respective item 101. The suggested items are depicted in a search result user interface 105 that includes the suggested items which may be rendered in a variety of user interfaces using a variety of methods. In one embodiment, a similarity engine 109 can receive as an input an identity of a particular item and identify similar items from an electronic catalog. In some embodiments, a user interface that contains information about a particular item can be provided with a user interface element, such as a link, that a user may follow to view additional items that are similar to the one presented in the user interface. As will be discussed in greater detail below, the similarity engine 109 can generate a modified query that can be provided to a search engine by modifying a user-supplied query with descriptive keywords contained in the keyword data associated with the item. The modified query can facilitate the locating of similar items in an electronic catalog. The modified query can also include brand designations for one or more brands that are positively correlated with the brand of the item based upon aggregate purchase history data.

Figure 2:
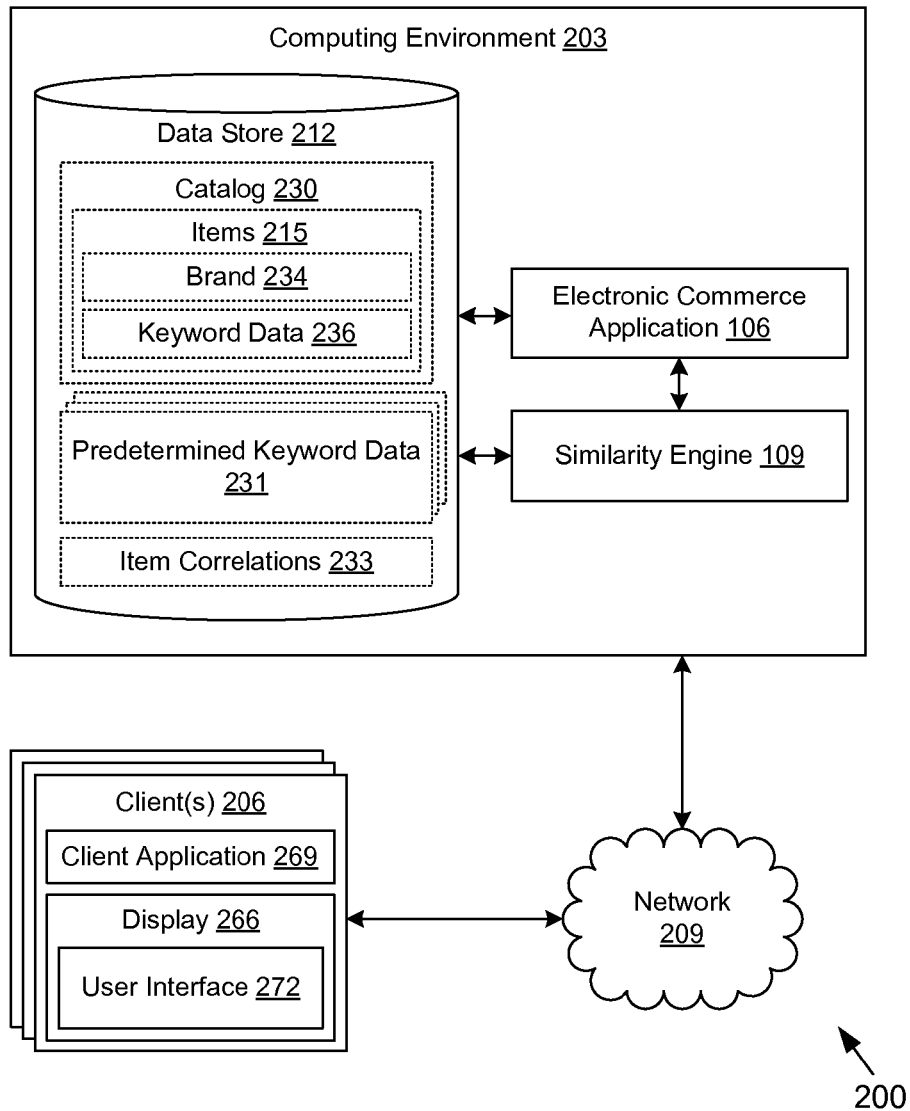
FIG. 2 is a block diagram of a networked environment according to various embodiments of the present disclosure.

With reference to FIG. 2, shown is a networked environment 200 according to various embodiments. The networked environment 200 includes a computing environment 203 and a client 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212 for example, is associated with the operation of the various applications and/or functional entities described below.

The components executed by the computing environment 203, for example, include an electronic commerce application 106, a similarity engine 109, and other applications, services, processes, systems, engines, or functionality not discussed in detail herein. The electronic commerce application 106 is executed in order to facilitate the online purchase of products or items 215 over the network 209. Items 215 may refer to any product, service, digital download, or any other item that may be offered for purchase, rental, download, lease, or other form of consumption. The electronic commerce application 106 also performs various backend functions associated with the online presence of a merchant in order to facilitate the online purchase of items 215. For example, the electronic commerce application 106 generates content pages such as web pages or other types of network content that are provided to clients 206 for the purposes of selecting items 215 for purchase, rental, download, lease, or other form of consumption.

The similarity engine 109 is executed to identify items that are similar to an item 215 to be presented to a user in a user interface or that is provided as an input to the similarity engine 109. For example, the similarity engine 109 can analyze keyword data or attributes associated with an item. The similarity engine 109 can then identify one or more predetermined descriptive terms that are in turn associated with the keyword data or attributes that are identified with respect to the item 215 in the electronic catalog. The similarity engine 109 can then initiate a search of a catalog 230 using a modified query that is generated from one or more of the predetermined descriptive terms. In some embodiments, the similarity engine 109 can also incorporate one or more category terms into the modified query based upon one or more item correlations, such as a brand correlation that associates brands with one another.

Accordingly, the electronic commerce application 106 can incorporate items similar to an input item as identified by the similarity engine 109. For example, the electronic commerce application 106 can generate a search result user interface that includes a listing of one or more similar items. As another example, the electronic commerce application 106 can include information about similar items on an item detail page that contains information about a particular item. For example, an item detail page can include user interface elements that allow a user to view information about a product available via an electronic commerce site, such as pictures, video, an item's description and/or specifications, and other information. Such an item detail page can also include user interface elements that facilitate purchase of the item. The electronic commerce application 106 can also include links to one or more similar items that are generated by the similarity engine 109 in such a user interface.

The data stored in the data store 212 includes, for example, data corresponding to a catalog 230, or an electronic catalog, and/or predetermined keyword data 231, item correlations 233, and potentially other data. A catalog 230 may comprise data regarding items 215 offered for sale by one or more merchants to be sold via an electronic commerce site facilitated by the electronic commerce application 106. A catalog 230 may include many fields of data regarding each item 215, such as a designation of a brand 234, keyword data 236, and other information about an item 215 offered for sale via the electronic commerce application 106.

For example, a catalog 230 may also include in association with an item 215 other data such as a title, price, weight, shipping methods, related images, reviews, a list of merchants selling the item 215, stock number, unique identifiers, associated categories, etc.

The catalog 230 may be arranged one or more logical taxonomies for categorizing items 215. A taxonomy may be characterized, for example, by a hierarchical data structure such as a tree. Thus, a taxonomy may be said to have a plurality of browse nodes in which each node may link to a plurality of child nodes, each of which may in turn link to further child nodes. A starting point in a taxonomy may be called a root node, while nodes having no child nodes are said to be leaf nodes. Child nodes, grandchild nodes, etc., of a root node may also be called descendants of the root node. Each node described within a taxonomy may be thought of as a category of items 215 that relate to one another. Each successive child node may more specifically define a relationship among items 215.

As a non-limiting example, a root node of a taxonomy may encompass all departments of an online retailer, such as books, digital downloads, electronics, and other departments. Each of the departments, or nodes, is associated with a plurality of items 215. A node associated with digital downloads in the taxonomy may be associated with child nodes including, for example, video downloads, audio downloads, game downloads, and/or other digital downloads. Each of these child nodes, or categories, may be further subdivided if necessary. For example, the audio downloads category node may be further subdivided by genre, such as classical, alternative rock, country, hip-hop, and so on. Ultimately, a node, or category, is associated with one or more items 215. It is further understood that an item may be associated with a plurality of browse nodes and/or a plurality of taxonomies as desired.

The mere fact that two particular items 215 are associated with a common browse node does not necessarily mean that the items are similar from the point of view of a prospective purchaser. For example, two apparel items that are associated with a common category or browse node, such as dresses, may also have very different properties in terms of color, style, price or other properties. These two apparel items may not be similar in any other way other than the fact that they are both dresses. Accordingly, recommending one of the items to a prospective purchaser who is interested in the other may not be a useful recommendation. For example, the prospective purchaser may be seeking a dress with polka-dots and may be viewing an item that is a dress with polka-dots. However, the second item may not have polka-dots, which might not be a comparable item.

Additionally, the prospective purchaser may be seeking a dress in a particular price point and may be viewing an item that is costs, for example $50.00. However, the second item may be a dress that is priced at $500.00, which is not necessarily a comparable item due to the price difference. Therefore, embodiments of the disclosure can identify similar items in a catalog 230 based upon descriptive keywords, or keyword data 236, which can provide a better indicator of the properties of an item 215 other than just the taxonomy in which the item 215 is placed in the catalog 230.

Predetermined keyword data 231 comprises one or more sets of keywords, categories, or other textual information that has been determined to facilitate the identification of similar items. In other words, predetermined keyword data 231 comprises keywords or other information that has been editorially determined to be interesting or useful with respect to identifying items 215 in the catalog 230. A set of predetermined keyword data 231 can comprise particular keywords for which the similarity engine 109 can search when identifying similar items in the catalog. For example, predetermined keyword data 231 can include a term such as "polka-dot," as it may be editorially determined that such a keyword facilitates the identification of similar items from the catalog 230. Other examples include terms that describe pattern, color, style, or any other descriptive words with respect to the item. Accordingly, the similarity engine 109, when identifying similar items for a particular item, can search the keyword data 236 for the item 215, and if the keyword data 236 contains the term "polka-dot," the modified query generated by the similarity engine 109 is formed to also include the term "polka-dot."

In some embodiments, a set of predetermined keyword data 231 can be associated with a particular category or attribute corresponding to items 215 in the catalog 230. For example, a particular set of the predetermined keyword data 231 can be linked with a particular attribute that is identified with respect to a particular item 215, such as a category designation of the item, a brand 234 of the item, and/or combinations of attributes of an item 215. For example, a certain set of the predetermined keyword data 231 can be linked with a term or attribute such as "men's t-shirts." As another example, a certain subset of the predetermined keyword data 231 can be associated with a term or attribute such as "women's blouses," or any other attribute, keyword or category designation associated with the item 215. In other words, a particular dictionary or vocabulary of keywords can comprise a set of predetermined keyword data 231 that can be associated with a particular attribute, keyword or category designation that is associated with an item 215.

Item correlations 233 comprise relationships between brands 234 or other categories or attributes associated with items 215 that are based, for example, on aggregate purchase history data for a population of users over a period of time. For example, the electronic commerce application 106 can identify correlations between brands 234 based upon the purchasing behavior of users over a particular period of time, such as the previous year, a number of months, or any other period of time. In other words, the electronic commerce application 106 can determine, based upon purchase history data stored in the data store 212, that a first brand 234 is positively correlated with another brand 234 by a threshold statistical measure. If such a correlation exists, the two brands can be correlated as an item correlation 233. A particular brand 234 may be correlated with multiple other brands 234. An item correlation 233 linking a brand 234 with another brand 234 based upon purchasing behavior data means that a customer who is interested the brand 234 is also likely to be interested in the other brand 234. Accordingly, the similarity engine 109 can locate similar items may examining items that are available in correlated brands, which can improve the quality of a recommendation for a particular similar item. Correlated brands are often similar in terms of price point and other aspects, which can improve the quality of a particular recommended item. Item correlations 233 can also link together items 215 based upon other attributes other than brand 234. For example, items 215 can also be correlated with one another based upon other category designations or attributes by which items 215 are categorized or grouped within the catalog 230.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application 269 and/or other applications. The client application 269 may be executed in a client 206, for example, to access network content served up by the computing environment 203 and/or other servers, thereby rendering a user interface 272 on the display 266. To this end, the client application 269 may comprise, for example, a browser, a dedicated application, etc., and the user interface 272 may comprise a network page, an application screen, etc. The client 206 may be configured to execute applications beyond the client application 269 such as, for example, email applications, social networking applications, word processors, spreadsheets, and/or other applications.

Next, a general description of the operation of the various components of the networked environment 200 is provided. To begin, the electronic commerce application 106 can generate a request that is received by the similarity engine 109 to identify items 215 that are similar to a particular item 215. For example, a user of the electronic commerce application 106 may have accessed an item detail page corresponding to an item 215 from the catalog 230. The request for similar items 215 may be generated by the electronic commerce application 106 as a part of the process of building the page and assembling content with which to populate the page. The similarity engine 109, upon receiving the request, can generate a modified query based upon an analysis of the item 215 as well as a user supplied query that caused the user to arrive at the item 215. In some scenarios, there may be no such user-supplied query, in which case the similarity engine 109 can generate the modified query based upon the analysis of the item 215. The similarity engine 109 can then initiate a search of the catalog 230 using the modified query, which can yield items that are similar to the item 215. These similar items, or a subset thereof, can be presented to a user in various ways, such as in a search result user interface, a user interface element or widget included in an item detail page, or in other various forms of user interfaces.

In order to perform an analysis of an item to generate a modified query, the similarity engine 109 extracts one or more item attributes that are associated with a particular set of predetermined keyword data 231 wherein the item attributes are contained within the keyword data 236 of a particular item. In one embodiment, the similarity engine 109 is configured to search for particular keywords, attributes or category designations within the keyword data 236 of the item 215 that are assigned a dictionary or a subset of the predetermined keyword data 231. For example, if a particular item 215 is associated with a category designation such as "men's t-shirt," the similarity engine 109 can identify a particular subset of the predetermined keyword data 231 that is also associated with "men's t-shirt" from which to generate a modified query with which similar items can be located.

The similarity engine 109 can be configured to first determine whether any category designations or structured attributes associated with the item 215 are associated with a particular set of predetermined keyword data 231. If no such association can be identified, the similarity engine 109 can then determine whether unstructured attributes in the keyword data 236 are associated with a particular set of predetermined keyword data 231 from which a modified query is generated.

In some embodiments, the predetermined keyword data 231 associated with the attributes extracted from the item 215 can designate a ranking or confidence score associated with a particular descriptive keyword. In other words, some keywords may be deemed more useful in identifying similar items than others, so they may be assigned a higher ranking, confidence score or other quantitative metric that reflects a higher importance.

In other words, the similarity engine 109 identifies the predetermined descriptive terms that have been editorially deemed to be useful for identifying or describing an item and/or for identifying similar items. The similarity engine 109 can then generate a modified query that includes one or more terms from the user-supplied query, if any, as well as one or more of the predetermined descriptive terms from the predetermined keyword data 231. Additionally, the similarity engine 109 can include one or more item correlations 233 associated with the item 215 so that a search initiated using the modified query can be directed to particular attributes, categories or other axes of correlation that have a positive correlation with the item 215 based upon aggregate purchase history data. In some embodiments, the similarity engine 109 can exclude data with respect to item correlations 233 from a modified query if a quantity of item correlations 233 fails to meet a threshold. For example, if the item 215 is correlated with less than a threshold number of other brands 234, the similarity engine 109 can exclude brand from a modified query with which similar items are identified.

In some embodiments, rather than correlating items 215 based upon brand 234, item correlations 233 can be generated based upon other categories to which an item is assigned, or a category term. For example, in the case of books, item correlations 233 may comprise authors having a positive correlation with one another. In the case of furniture, items correlations 233 may comprise a design period or a country of origin. As another example, item correlations 233 for music can be established based upon artist. In other words, it should be appreciated that item correlations 233 can be generated and employed to identify similar items based upon any category term or category to which an item 215 is assigned according to various embodiments of the disclosure.

Accordingly, the user supplied query, one or more terms from predetermined keyword data 231, and item correlations 233 (e.g., brand with which the item 215 is correlated), can be used to form the modified query in various ways. In one scenario, the similarity engine 109 can select a subset of the predetermined keyword data 231 from the keyword data 236 of the item 215, such as the highest ranked N terms from the keyword data 236. The terms from the predetermined keyword data 231 can then be combined with the terms from the user-supplied keyword by a logical operator, such as a logical AND or a logical OR operator. Additionally, the modified query can be combined with the item correlations 233 with a logical operator as well.

In some embodiments, the modified query generated by the similarity engine 109 can include one or more terms from the user supplied query, predetermined keyword data 231, and then a search can be initiated that is limited to attributes and/or categories, such as brands, that are denoted by the item correlations 233. In some scenarios, terms from a user-supplied keyword may not correspond to an item in which a user has eventually indicated an interest and for which similar items are requested by the electronic commerce application 106 from the similarity engine 109. In this scenario, the similarity engine 109 can remove or exclude terms from the modified query that are from the user-supplied query if these terms are also not within the keyword data 236 of the item 215. Terms from the user supplied query can be included within the modified query if they are extracted from the keyword data 236 associated with the item 215 and they are not also within the predetermined keyword data 231 that is identified with respect to the item 215.

In other words, if terms from the user-supplied query were not helpful in surfacing the particular item, they can be omitted from the modified query. A term from the user-supplied query can be considered unhelpful in surfacing the item if it is not also in the keyword data 236 of the item 215. Additionally, the modified query generated by the similarity engine 109 can also weight the predetermined keyword data 231 from the keyword data 236 according to a ranking, confidence score, or importance factor of those of the predetermined keyword data 231 included within the modified query so that higher ranked keywords of the predetermined keyword data 231 included in the modified query are weighted more strongly than lesser ranked keywords of the predetermined keyword data 231.

Next, the similarity engine 109 can initiate a search of the catalog 230 using the modified query and identify one or more items 215 from the catalog 230 that are considered to be items 215 that are related to the item 215. In one embodiment, the similarity engine 109 can provide a list of items 215 to the electronic commerce application 106 in response to a request to identify similar items 215. The electronic commerce application 106 can present information about the similar items 215 to a user in various ways. Accordingly, reference is now made to FIGS. 3-5 to illustrate example scenarios of ways in which information about similar items identified by the similarity engine 109 can be presented to a user.

Figure 3:
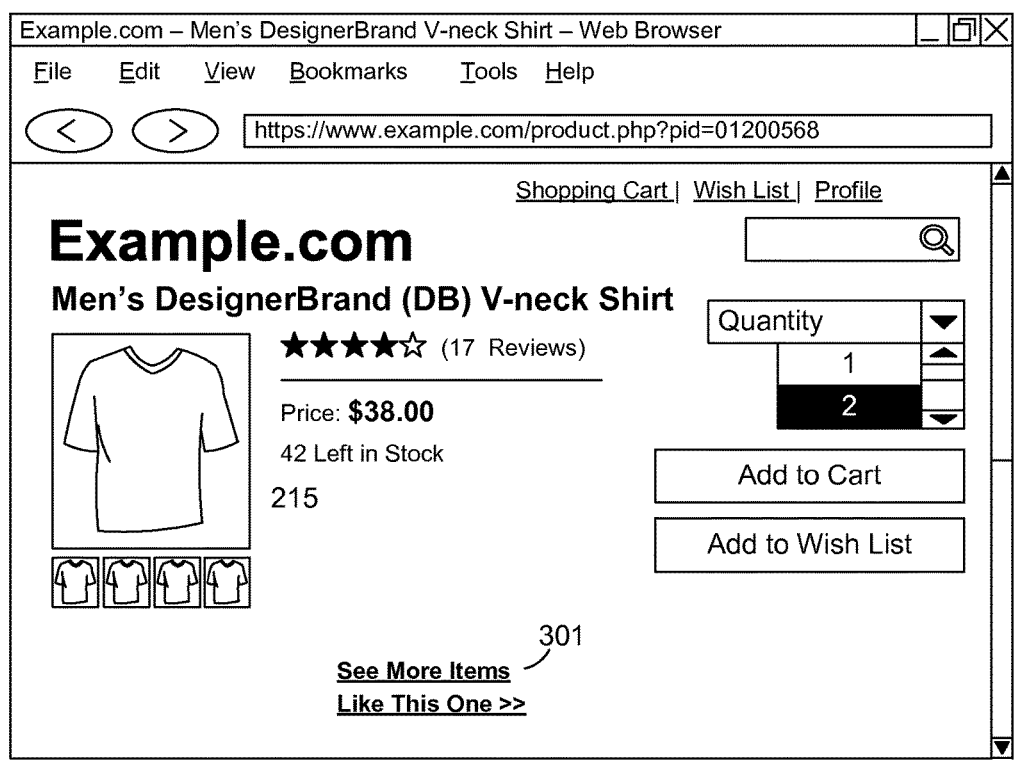
FIG. 3 is an example user interface generated in the networked environment of FIG. 2 according to various embodiments of the present disclosure.

Referring to FIG. 3, shown is an example of a user interface 272 generated by the electronic commerce application 106 (FIG. 1) and rendered in a client application 269 (FIG. 2) according to various embodiments. In this non-limiting example, a page generated by an electronic commerce application 106 shows information about a particular item 215 available through via electronic commerce application 106. For example, by conducting a search for "t shirt" in a search engine, the electronic commerce application 106 can surface the depicted item 215 and generate an item detail page that presents information, imagery, video, pricing and other information about the item that can be retrieved from the catalog 230.

In this non-limiting example, the item detail page corresponding to an item 215 available for purchase in an electronic commerce application 106 depicts an item 215 of clothing label as "Men's DesignerBrand V-neck Shirt," wherein "DesignerBrand" identifies a brand of the item of the clothing. The information page displays various information associated with the item 215 stored in data store 212 (e.g., title, price, description, reviews, etc.). As may be appreciated, a user may specify a quantity of items 215 desired to be added to a virtual shopping cart or to a virtual "wish list."

The electronic commerce application 106 can also insert a user interface element 301, such as a link, that, if followed or activated by the user, can generate a request to the similarity engine 109 to identify items 215 from the catalog 230 that are similar to the item 215 depicted in the user interface. Such a request can include an identifier that identifies the item 215, a user supplied query that the user may have provided to the electronic commerce application 106 to arrive at the item 215 shown in FIG. 3, as well as information about the user, such as a user identifier.

Figure 4:
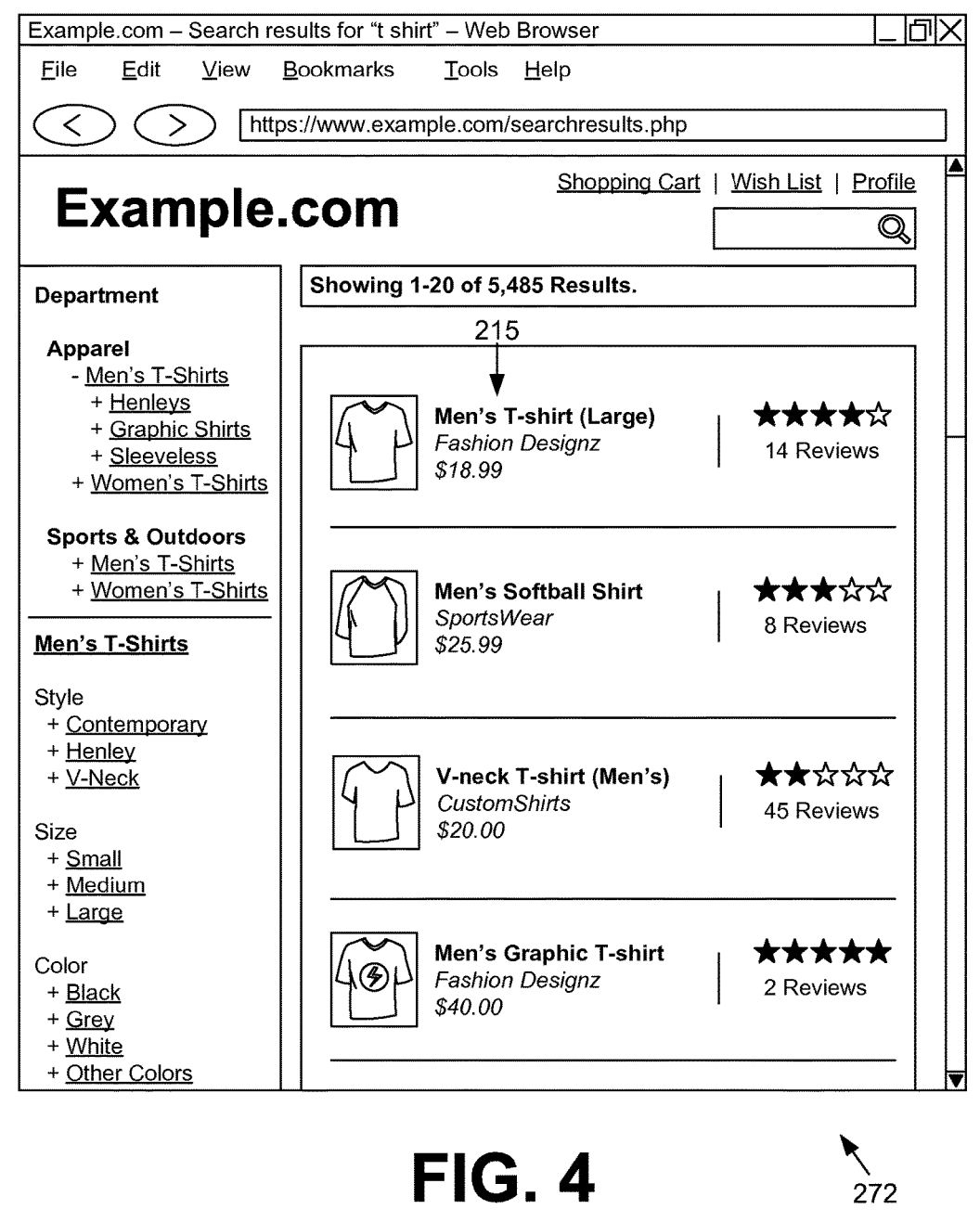

Continuing the example of FIG. 3, reference is now made to FIG. 4, which depicts another user interface 272 generated by the electronic commerce application 106 (FIG. 1) and rendered in a client application 269 (FIG. 2) according to various embodiments. In this non-limiting example, a search result user interface is shown that depicts information about various similar items identified by the similarity engine 109 as requested by the electronic commerce application 106. As noted above, the similar items are identified based upon a modified query generated by the similarity engine 109 and a search of the catalog 230 initiated by the similarity engine 109.

Figure 5:
FIG. 5 is an example user interface generated in the networked environment of FIG. 2 according to various embodiments of the present disclosure.

Continuing the example of FIGS. 3-4, reference is now made to FIG. 5, which depicts another user interface 272 generated by the electronic commerce application 106 (FIG. 1) and rendered in a client application 269 (FIG. 2) according to various embodiments. In this non-limiting example, a page generated by an electronic commerce application 106 shows information about a particular item 215 available through via electronic commerce application 106. Additionally, the electronic commerce application 106, to build and assemble the page, can request information about similar items from the similarity engine 109. Accordingly, the similarity engine 109 can identify similar items by generating a modified query and initiating a search of the catalog 230. The electronic commerce application 106 can include information about these similar items in the user interface 272 within the user interface element 501 along with links that allow a user to view additional items about the respective similar item.

Figure 6:
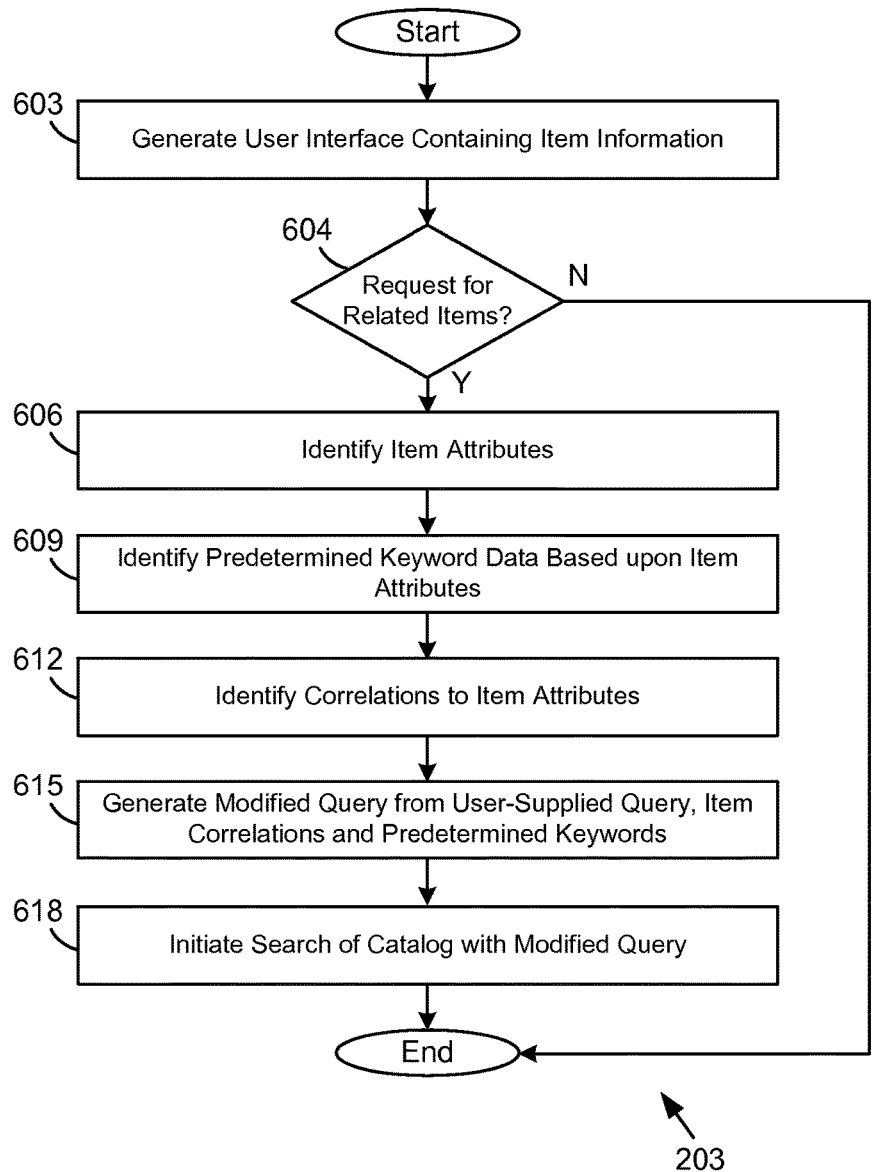
FIG. 6 is a flowchart illustrating one example of functionality implemented as portions of the electronic commerce application and/or similarity engine executed in a computing environment in the networked environment of FIG. 2 according to various embodiments of the present disclosure.

Referring next to FIG. 6, shown is a flowchart that provides one example of the operation of a portion of the electronic commerce application 106 and/or similarity engine 109 executed by the computing environment 203 according to various embodiments. It is understood that the flowchart of FIG. 5 provides merely an example of the many different types of functional arrangements that may be employed to implement the operation of the portion of the electronic commerce application 106 and/or similarity engine 109 as described herein. As an alternative, the flowchart of FIG. 6 may be viewed as depicting an example of steps of a method implemented in the computing environment 203 (FIG. 2) according to one or more embodiments.

Beginning with box 603, the electronic commerce application 106 can generate a user interface, such as an item detail page, that contains information about an item 215 in a catalog 230. For example, a user of an electronic commerce application 106 may navigate to an information page corresponding to an item 215, service, or product. Next, at box 604, the electronic commerce application 106 can determine whether the similarity engine 109 should identify other items from the catalog 230 that are similar to the item 215 from the catalog 230. In one embodiment, such a determination can be made depending on whether the electronic commerce application 106 includes information about similar item in the item detail page or whether a user has followed a link provided in the item detail page that causes a user interface containing information about similar items to be generated.

Next, in box 606, the similarity engine 109 can identify one or more attributes from the keyword data 236 associated with the item 215. The attributes associated with the item 215 can include categories associated with the item 215 as well as unstructured keywords or attributes linked with the item 215 within the catalog 230. Next, at box 609, the similarity engine 109 can identify a set of predetermined keyword data 231 from which a modified query can be generated at box 609. The set of predetermined keyword data 231 can be identified based upon structured attributes associated with the item 215 within the catalog 230 or unstructured attributes or keywords associated with the item 215 in the catalog 230 as keyword data 236. At box 612, the similarity engine can identify item correlations 233 associated with the item 215 in order to identify other attributes or categories of items, such as other brands, that are positively correlated with the item 215 based upon aggregate purchasing behavior data based upon historical purchase history data. As noted above, rather than identifying positively correlated items based upon brand, any other attribute or category designation can also be used, such as product type, artist, author, etc.

At box 615, the similarity engine 109 can generate a modified query based upon the user-supplied query that the user supplied to arrive at the item 215, from the identified item correlations 233, and from the predetermined descriptive keywords from the predetermined keyword data 231 that also appear within the keyword data 236 of the item 215. At box 618, the similarity engine 109 can initiate a search of the catalog 230 using the modified query. In some embodiments, the electronic commerce application 106 can then generate a user interface, such as a search result user interface, or an user interface element containing information about one or more of the search results, such as within item detail page containing information about the item 215. Thereafter, the process shown in FIG. 6 proceeds to completion.

Figure 7:
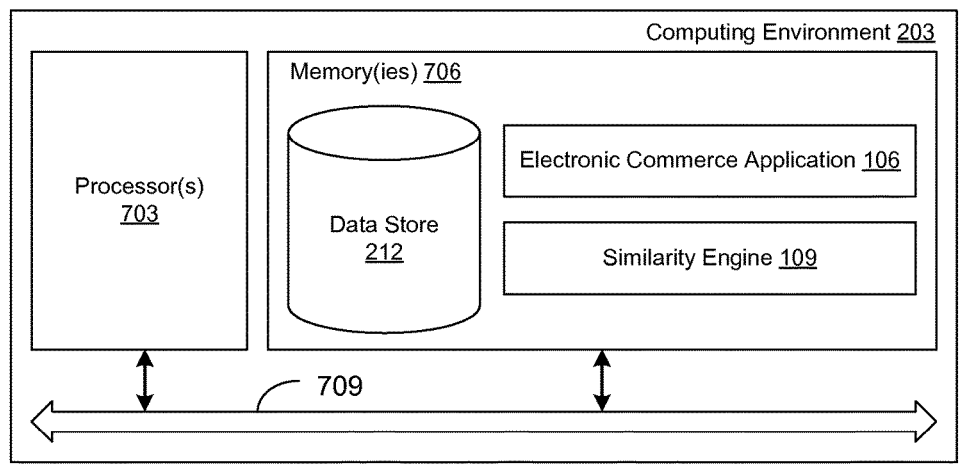
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 203 according to an embodiment of the present disclosure. The computing environment 203 includes one or more computing devices. Each computing environment 203 includes at least one processor circuit, for example, having a processor 703 and a memory 706, both of which are coupled to a local interface 709. To this end, each computing environment 203 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce application 106, the similarity engine 109, and potentially other applications. Also stored in the memory 706 may be a data store 212 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the electronic commerce application 106, the similarity engine 109, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the similarity engine 109 and/or electronic commerce application 106. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 106 and/or the similarity engine 109, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Therefore, the following is claimed:

1. A non-transitory computer-readable medium embodying a program executable in at least one computing device, wherein the program, when executed, causes the at least one computing device to at least:

associate a particular brand of an item with at least one other brand based upon a correlation between the particular brand and the at least one other brand, the correlation identified from aggregate purchase data of a population of users for which purchase history data is maintained in a data store;

generate a user interface comprising data associated with the item in response to receiving a user supplied query, the data associated with the item being retrieved from an electronic catalog, the user interface comprising a hyperlink causing generation of a search result user interface element in which data associated with at least one related item is displayed;

receive a request that was generated in response to a user activating the hyperlink displayed on the user interface;

in response to receiving the request, generate a modified search query based upon the at least one other brand, the user supplied query and keyword data associated with the item in the electronic catalog, wherein the keyword data comprises a subset of a plurality of predetermined keywords, the plurality of predetermined keywords comprising a plurality of keywords selected from a plurality of catalog categories associated with the item;

exclude at least one term of the user supplied query from the modified search query in response to a determination that the at least one term does not appear in the keyword data associated with the item in the electronic catalog;

identify the at least one related item by initiating a search of the electronic catalog using the modified search query; and update the user interface to include the search result user interface element in response to initiation of the search of the electronic catalog, the search results user interface element comprising the at least one related item.

2. The non-transitory computer-readable medium of claim 1, wherein the plurality of predetermined keywords comprises a plurality of preselected descriptive terms.

3. The non-transitory computer-readable medium of claim 1, wherein generating the modified search query further causes the at least one computing device to at least identify the subset of the plurality of predetermined keywords based at least in part upon the keyword data associated with the item in the electronic catalog.

4. The non-transitory computer-readable medium of claim 1, wherein the at least one term comprises a first term, and generating the modified search query further causes the at least one computing device to at least include a second term from the user supplied query in the modified search query.

5. The non-transitory computer-readable medium of claim 1, wherein generating the modified search query further causes the at least one computing device to at least exclude the at least one other brand from the modified search query in response to a determination that a quantity of the at least one other brand fails to meet a threshold.

6. The non-transitory computer-readable medium of claim 1, wherein generating the modified search query further causes the at least one computing device to at least include at least one brand keyword corresponding to the at least one other brand in the modified search query.

7. A system, comprising:

at least one computing device; and a similarity engine executed in the at least one computing device, wherein the similarity engine, when executed, causes the at least one computing device to at least:

generate a user interface comprising data associated with a first item in response to receiving a user supplied query, the data associated with the first item being retrieved from an electronic catalog, the user interface comprising a hyperlink causing generation of a request for a search result user interface element in which data associated with a plurality of items are displayed;

receive the request in response to the activation of the hyperlink, wherein receiving the request causes an identification of the plurality of items that are similar to the first item associated with the electronic catalog;

generate a modified query based at least in part upon the first item, the user supplied query and keyword data associated with the first item in the electronic catalog;

exclude at least one term of the user supplied query from the modified query in response to a determination that the at least one term does not appear in the keyword data associated with the first item in the electronic catalog;

initiate a search of the electronic catalog using the modified query, the search returning the plurality of items that are similar to the first item; and update the user interface to include the search result user interface element in response to initiation of the search of the electronic catalog, the search results user interface element comprising at least one of the plurality of items that are similar to the first item.

8. The system of claim 7, wherein generating the modified query further causes the at least one computing device to at least identify a plurality of descriptive terms in the keyword data associated with the first item, the plurality of descriptive terms being at least one of a plurality of preselected descriptive terms.

9. The system of claim 8, wherein the plurality of descriptive terms is selected based upon an attribute associated with the first item in the electronic catalog.

10. The system of claim 8, wherein the plurality of preselected descriptive terms are ranked according to an importance factor.

11. The system of claim 10, wherein generating the modified query further causes the at least one computing device to at least weight a plurality of terms of the modified query according to a respective importance factor of each of the plurality of descriptive terms in the keyword data associated with the first item.

12. The system of claim 7, wherein generating the modified query further causes the at least one computing device to at least add at least one category term to the modified query, wherein the at least one category term is identified based a corresponding category designation of the first item.

13. The system of claim 12, wherein the at least one category term comprises at least one brand having a correlation with a brand of the first item.

14. The system of claim 13, wherein the similarity engine, when executed, further causes the at least one computing device to at least identify the correlation between the at least one brand and the brand of the first item based at least in part upon aggregate purchase data of a population of users for which purchase history data is maintained in a data store.

15. The system of claim 7, wherein the request to identify the plurality of items that are related to the first item is received from a user interface element presented in the user interface displaying information about the first item obtained from the electronic catalog.

16. A method, comprising:
- generating, in at least one computing device, a user interface comprising data associated with a first apparel item in response to receiving a user supplied query, the data associated with the first apparel item being retrieved from an electronic catalog, the user interface comprising a hyperlink causing generation of a request for a search result user interface element in which data associated with a plurality of apparel items are displayed;
- receiving, in the at least one computing device, the request in response to the activation of the hyperlink, wherein receiving the request causes an identification of the plurality of apparel items that are similar to the first apparel item from the electronic catalog;
- generating, in the at least one computing device, a modified query having a plurality of terms and being based at least in part upon the user supplied query and a plurality of descriptive terms associated with the first apparel item in the electronic catalog;
- excluding, in the at least one computing device, at least one term of the user supplied query from the plurality of terms in response to a determination that the at least one term is not within keyword data associated with the first apparel item in the electronic catalog;
- initiating, in the at least one computing device, a search of the electronic catalog using the modified query, the search returning the plurality of apparel items that are similar to the first apparel item; and
- updating, in the at least one computing device, the user interface to include the search result user interface element in response to initiation of the search of the electronic catalog, the search results user interface element comprising at least one of the plurality of apparel items that are similar to the first apparel item.

17. The method of claim 16, wherein the plurality of descriptive terms associated with the first apparel item are selected based at least in part upon a correlation between a category designation of the first apparel item and a corresponding category designation of at least one other item associated with the electronic catalog.

18. The method of claim 17, wherein the category designation comprises at least a brand of the first apparel item.

19. The method of claim 17, further comprising identifying, in the at least one computing device, the correlation between the category designation of the first apparel item and the corresponding category designation of the at least one other item based at least in part upon aggregate purchase data of a population of users for which purchase history data is maintained in a data store.

20. The method of claim 16, further comprising generating, in the at least one computing device, a network page for the first apparel item, wherein the network page includes the plurality of apparel items that are similar to the first apparel item.

21. The method of claim 16, wherein the user interface element comprises a plurality of links that each individually correspond with the at least one of the plurality of apparel items.

* * * * *